(12) United States Patent  (10) Patent No.: US 7,779,944 B2
Bergman et al.  (45) Date of Patent: Aug. 24, 2010

(54) SNOWMOBILE TUNNEL AND REAR HEAT EXCHANGER

(75) Inventors: Ronald Bergman, McIntosh, MN (US); Ken Fredrickson, Thief River Falls, MN (US); Russell L. Ebert, Lakeshore, MN (US)

(73) Assignee: Arctic Cat Inc., Thief River Falls, MN (US)

( * ) Notice: Subject to any disclaimer, the term of this patent is extended or adjusted under 35 U.S.C. 154(b) by 641 days.

(21) Appl. No.: 11/680,465

(22) Filed: Feb. 28, 2007

(65) Prior Publication Data

US 2007/0193715 A1  Aug. 23, 2007

Related U.S. Application Data

(63) Continuation-in-part of application No. 10/953,940, filed on Sep. 29, 2004, now Pat. No. 7,328,765.

(51) Int. Cl.
*B60K 11/04* (2006.01)
(52) U.S. Cl. .............................. 180/68.4; 180/190
(58) Field of Classification Search .............. 180/68.1, 180/68.4, 68.6, 182, 190
See application file for complete search history.

(56) References Cited

U.S. PATENT DOCUMENTS

| | | | |
|---|---|---|---|
| 5,152,255 A * | 10/1992 | Fukuda | 123/41.33 |
| 5,232,066 A | 8/1993 | Schnelker | |
| 5,251,718 A * | 10/1993 | Inagawa et al. | 180/190 |
| D362,207 S | 9/1995 | Hacke et al. | |
| 5,568,840 A | 10/1996 | Nagata et al. | |
| 5,957,230 A * | 9/1999 | Harano et al. | 180/68.4 |
| 6,109,217 A | 8/2000 | Hedlund et al. | |
| 6,491,125 B2 | 12/2002 | Girouard et al. | |
| 6,604,594 B2 | 8/2003 | Wubbolts et al. | |
| 6,651,764 B2 | 11/2003 | Fournier et al. | |
| 6,672,602 B2 | 1/2004 | Way, II et al. | |
| D488,096 S | 4/2004 | Cadotte et al. | |
| 6,749,036 B1 | 6/2004 | Schrapp et al. | |
| 6,802,383 B2 | 10/2004 | Nishijima | |
| 6,808,034 B2 | 10/2004 | Nakano et al. | |
| 6,840,344 B2 | 1/2005 | Galbraith et al. | |
| 7,063,178 B2 | 6/2006 | Etou | |
| 7,213,638 B2 * | 5/2007 | Seiler et al. | 165/148 |
| 7,353,901 B2 * | 4/2008 | Abe et al. | 180/190 |
| 2004/0090119 A1 | 5/2004 | Ebert et al. | |

* cited by examiner

*Primary Examiner*—S. Joseph Morano
*Assistant Examiner*—Bridget Avery
(74) *Attorney, Agent, or Firm*—Black Lowe & Graham PLLC

(57) ABSTRACT

The top wall of a snowmobile tunnel, which accommodates the endless drive track of the snowmobile, is provided with recesses at locations corresponding to the path followed by studs carried by the endless track. The rear of the tunnel is connected to a molded rear member having a pattern of recesses matching that of the top wall of the tunnel. In yet another aspect of the invention, a heat exchanger for cooling engine coolant may be provided at the rear of the tunnel. The heat exchanger may be mounted to and partially spaced from the molded rear member. The heat exchanger may bear rearwardly extending ridges with upwardly extending lip at the far end. In some embodiments, a channel is provided on the upper end of the heat exchanger to promote air and snow flow over the rearwardly extending ridges.

18 Claims, 13 Drawing Sheets

SNOWMOBILE TUNNEL AND REAR HEAT EXCHANGER

PRIORITY CLAIM

This application is a continuation-in-part of U.S. patent application Ser. No. 10/953,940 filed Sep. 29, 2004.

FIELD OF THE INVENTION

This invention relates generally to snowmobiles and, more specifically, to cooling systems for snowmobiles.

BACKGROUND OF THE INVENTION

The present invention relates to a tunnel structure and rear heat exchanger for a snowmobile. The driving system for a snowmobile, e.g. an endless track, is accommodated within a structure known as a tunnel, which has a top wall and sidewalls. Endless tracks for snowmobiles often are provided with longitudinal rows of studs that protrude from the surface of the endless track and provide improved traction. In order to prevent damage to the snowmobile from the studs, sufficient clearance needs to be provided.

In addition, snowmobiles often are powered by liquid cooled engines. It would be desirable to improve the cooling capacity of the cooling system for a snowmobile engine.

SUMMARY OF THE INVENTION

In accordance with one aspect of this invention, a heat exchanger for a snowmobile includes a radiator having front, rear, top, first lateral, second lateral, and bottom surfaces. The radiator secures to the chassis above at least a portion of the track and includes a fluid channel. A plurality of ridges extend across the rear surface between the first and second lateral surfaces of the radiator. In some embodiments, an upwardly extending lip extends from a distal end of each of the ridges.

A channel may be formed in the top surface of the radiator extending between the front and rear surfaces to facilitate passage of snow onto the ridges. A number of fins may secure to the rear surface of the heat exchanger between the plurality of ridges. The fins may be substantially smaller than the ridges.

BRIEF DESCRIPTION OF THE DRAWINGS

Preferred and alternative embodiments of the present invention are described in detail below with reference to the following drawings.

DETAILED DESCRIPTION OF THE PREFERRED EMBODIMENT

Figure 1:
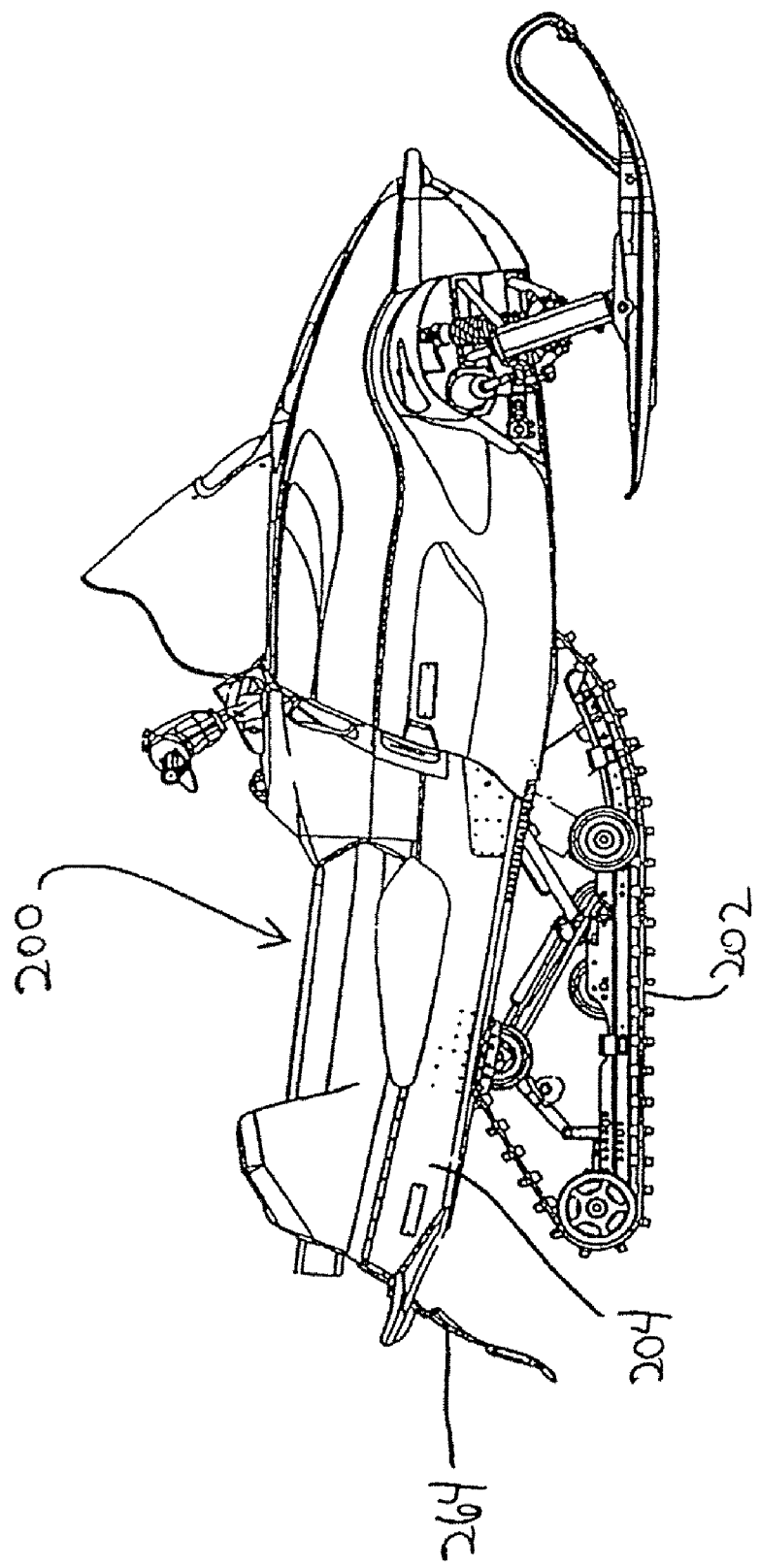
FIG. 1 is a side view of a snowmobile of the present invention.
Figure 2:
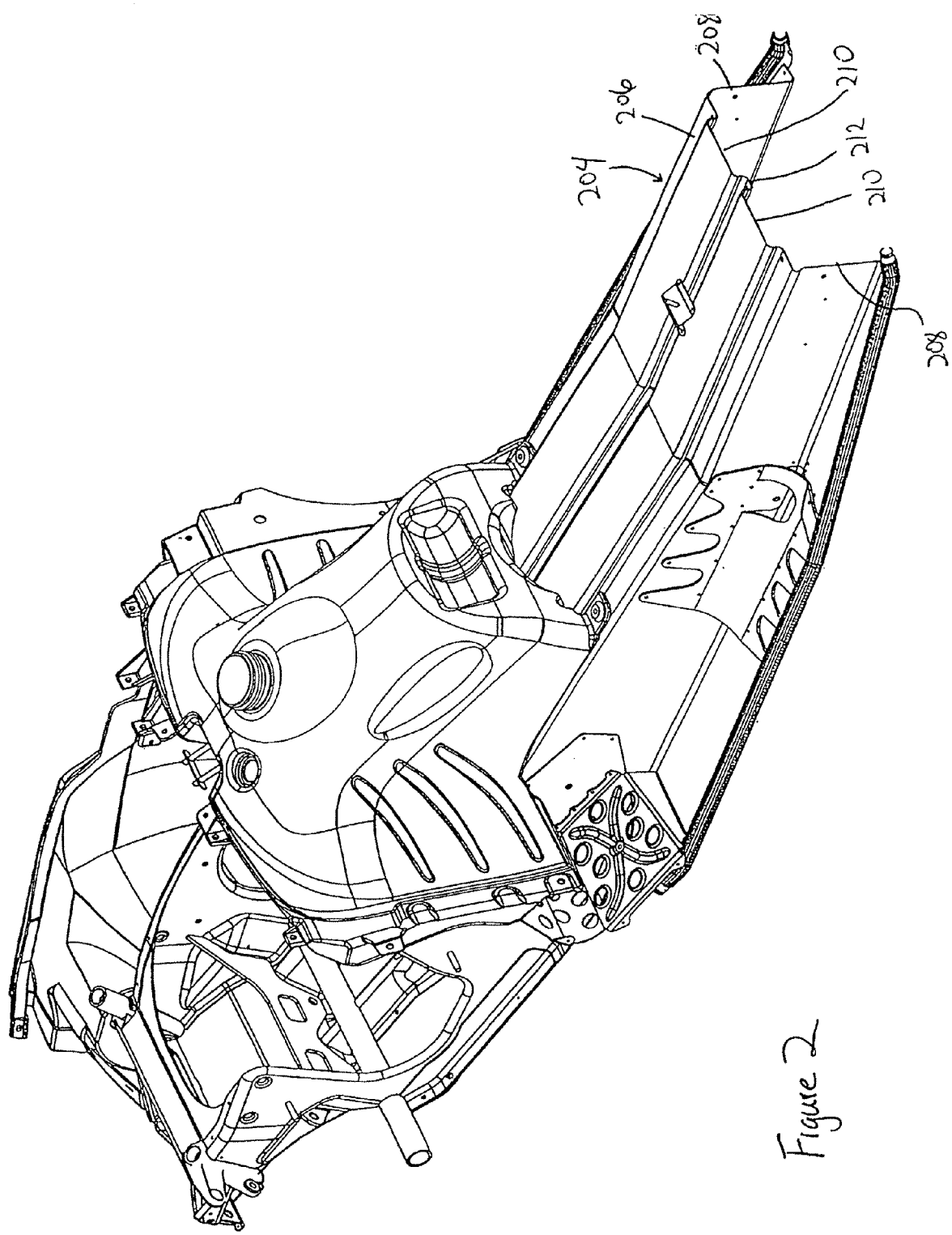
FIG. 2 is a perspective view showing the tunnel of a snowmobile of the present invention from the rear of the tunnel.
Figure 3:
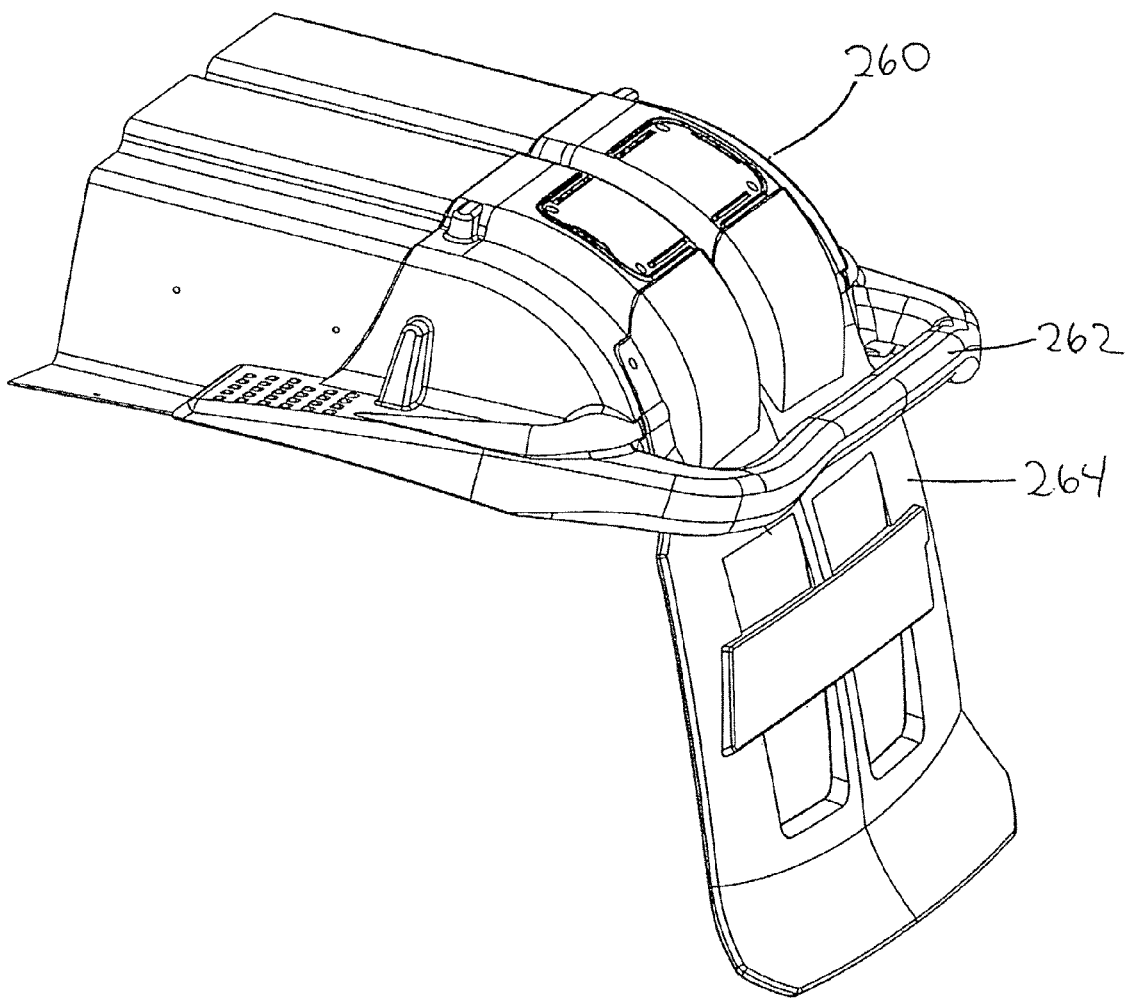
FIG. 3 is a perspective view of a molded rear member secured to the tunnel of a snowmobile of the present invention.
Figure 4:
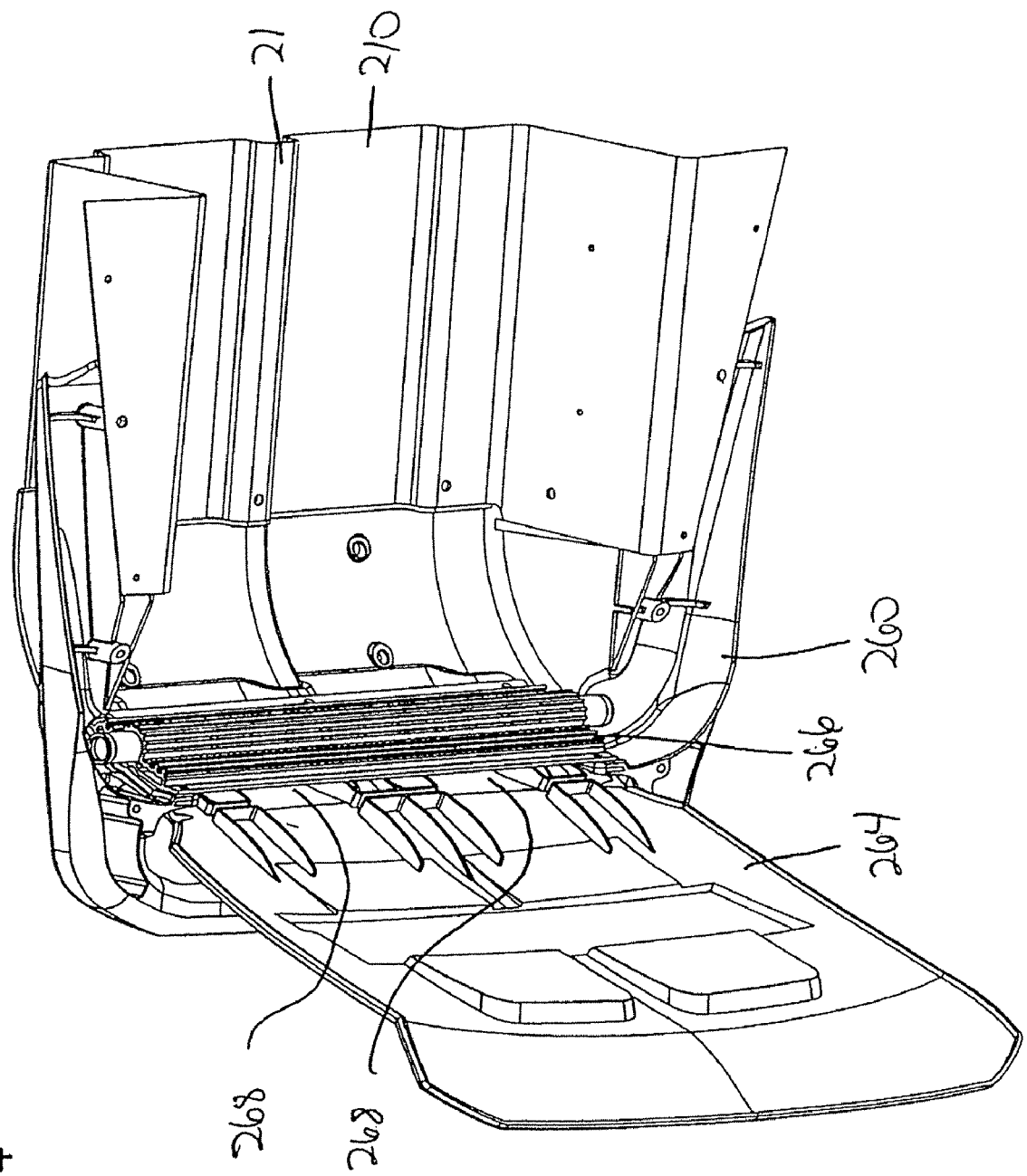
FIGS. 4 and 7 are views of the molded rear member from the bottom, showing a heat exchanger for cooling fluid from the snowmobile engine.
Figure 5:
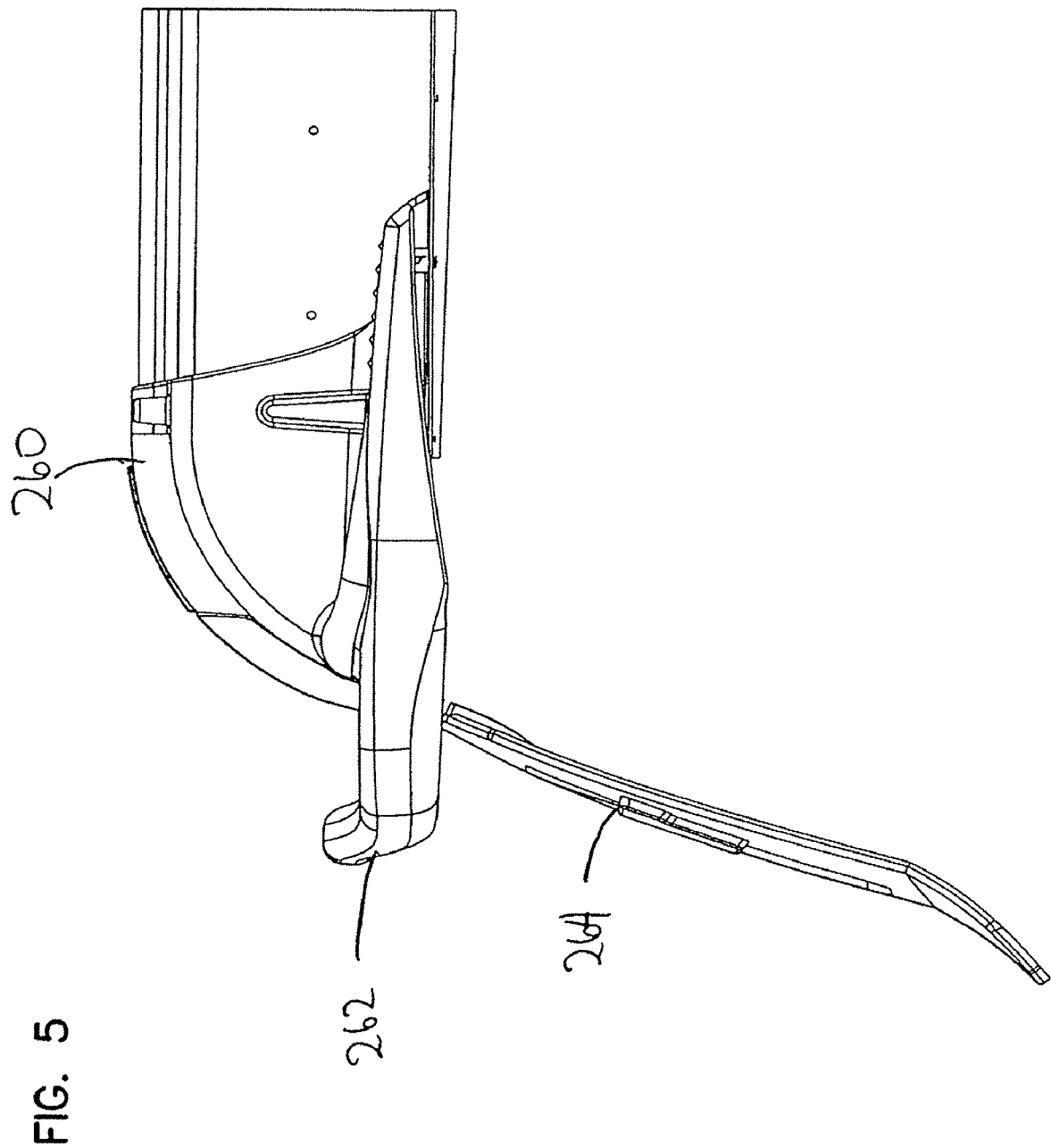
FIG. 5 is a side view of the molded rear member.
Figure 6:
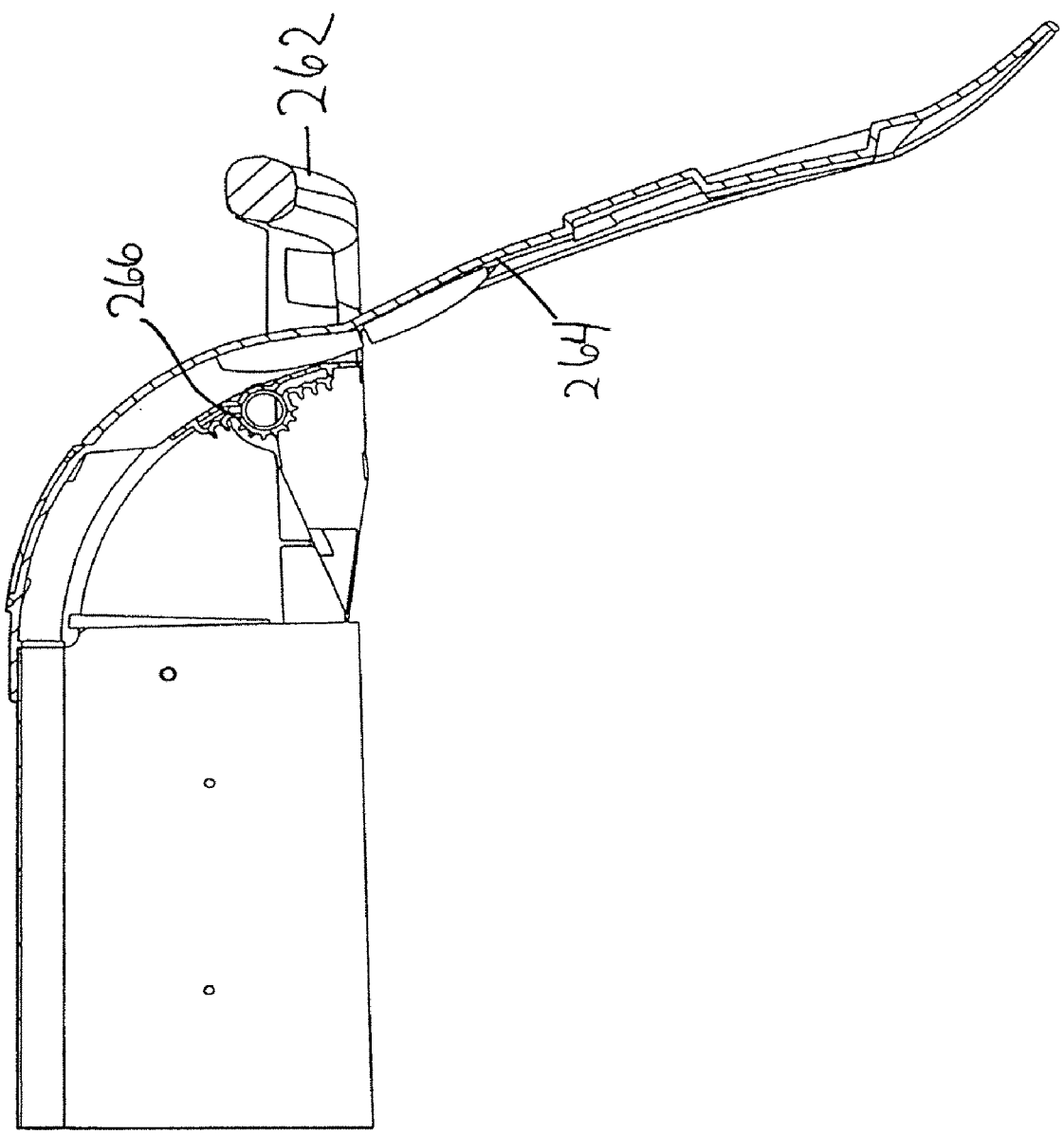
FIG. 6 is a sectional side view of the molded rear member.

Referring to FIGS. 1 and 2, a snowmobile 200 is driven by endless track 202. The endless track 202 is accommodated in a tunnel structure 204. The tunnel has a top wall 206 and sidewalls 208. The top wall of the tunnel is provided with recesses 210 at locations corresponding to the path followed by the studs provided on the endless track. The recesses can extend the length of the tunnel, or can be terminated outside of portions of the tunnel where the clearance with studs carried by the endless track is not an issue.

Preferably, the recesses are at least two in number, with at least one rib member 212 between the recesses. This structure helps to strengthen the tunnel. Also the tunnel preferably has a substantially uniform wall thickness. That is, the recesses have substantially the same wall thickness as the other parts of the top wall of the tunnel and the sidewalls.

The recesses have a width and spacing corresponding to the stud pattern on the endless track. In a typical example, the recesses may be about 4 to 5 inches wide (about 10-13 cm), for example about 4.5 inches wide (11.5 cm). The depth of the recesses will depend on the studs that are to be used. Typically the depth will be about 0.5 to 1 inch (1.3 to 2.5 cm), for example about three fourths of an inch (2 cm).

The tunnel can be made out of any suitable material, for example a metal such as aluminum. The tunnel can be formed by any suitable method, including pressing, bending or extruding.

The tunnel may be flared from front to back. At the front of the snowmobile, the position of the endless track and its associate components can be controlled more closely, permitting narrowing of the tunnel, particularly the top of the tunnel, at the front to increase rider comfort. At the same time, the increased width of the tunnel at the rear of the snowmobile can provide the desired clearance for the looser tolerance that may be present at the rear of the drive track. In one embodiment, the front of the tunnel top may be about 0.5 to 1.5 inches (1.3 to 3.8 cm) narrower than the rear of the tunnel for example, about 1 inch (2.5 cm), and the taper may be uniform from front to back. If the top and bottom of the tunnel are not the same width at a given location along the length of the tunnel, the width may vary gradually from top to bottom.

Referring to FIGS. 3-6, the rear of the snowmobile may include a rear molded member 260 at the rear of the tunnel. The rear molded member may be made of any suitable plastic material, for example high density polyethylene or other suitable resin, and can be formed by a suitable molding process, for example a process in which the product is created by the setting of a softened or molten material that has been formed into a desired configuration. The plastic material can be filled with glass fiber or other fillers to provide desirable properties. The rear molded member can provide a bumper for the snowmobile, as illustrated by element 262. The rear member may be secured to the tunnel in any suitable way, including, for example, fasteners such as screws, adhesives, mechanical engagement, hook and loop fasteners, press fitting or friction fitting. In one embodiment, the forward edge of the rear molded member defines a lip that overlaps the inside or outside of the tunnel so that a fastener such as a screw may be passed through both, thereby facilitating the connection between the tunnel and the rear molded member.

The rear member may be adapted for mounting of a flap 264 that reduces the chances of snow and other debris being thrown from the underside of the snowmobile. The flap can be mounted in any suitable way, including, for example, fasteners such as screws, adhesives, heat or solvent welding, mechanical engagement, and hook and loop fasteners. The rear molded member can be adapted for mounting of lights, reflectors, etc. as desired or needed for compliance with governmental regulations.

In a preferred embodiment, the rear molded member curves downwardly toward the rear of the snowmobile and has a recess structure corresponding to that of the top of the tunnel. This structure is particularly useful in combination with a rear heat exchanger 266. Coolant is delivered to this rear heat exchanger, for example, through a coolant passage that extends along one side of the snowmobile (see FIG. 2), and is returned to the engine through a coolant passage that extends along the other side of the snowmobile. The coolant passages and the rear heat exchanger are connected with suitable pipes or hoses. In one embodiment, these connections pass underneath the rear molded member, although it would be possible to arrange for the connections to pass through the sidewall of the rear molded member instead.

The heat exchanger preferably is mounted to be spaced somewhat from the rear member, for example at a surface of the rear member that has recesses corresponding to those of the top wall. Thus, the heat exchanger may be supported at the edges and center of the rear molded member, but spaced from the rear molded member by the recesses. See the spaces identified as 268. Snow thrown by the endless track will impact the inward-facing surface of the heat exchanger, and this arrangement also makes it possible for snow to pass behind the heat changer as well. This increases the cooling ability of the heat exchanger. The heat exchanger may be mounted to the rear molded member, for example with a fastener such as a screw or other means.

Figure 7:
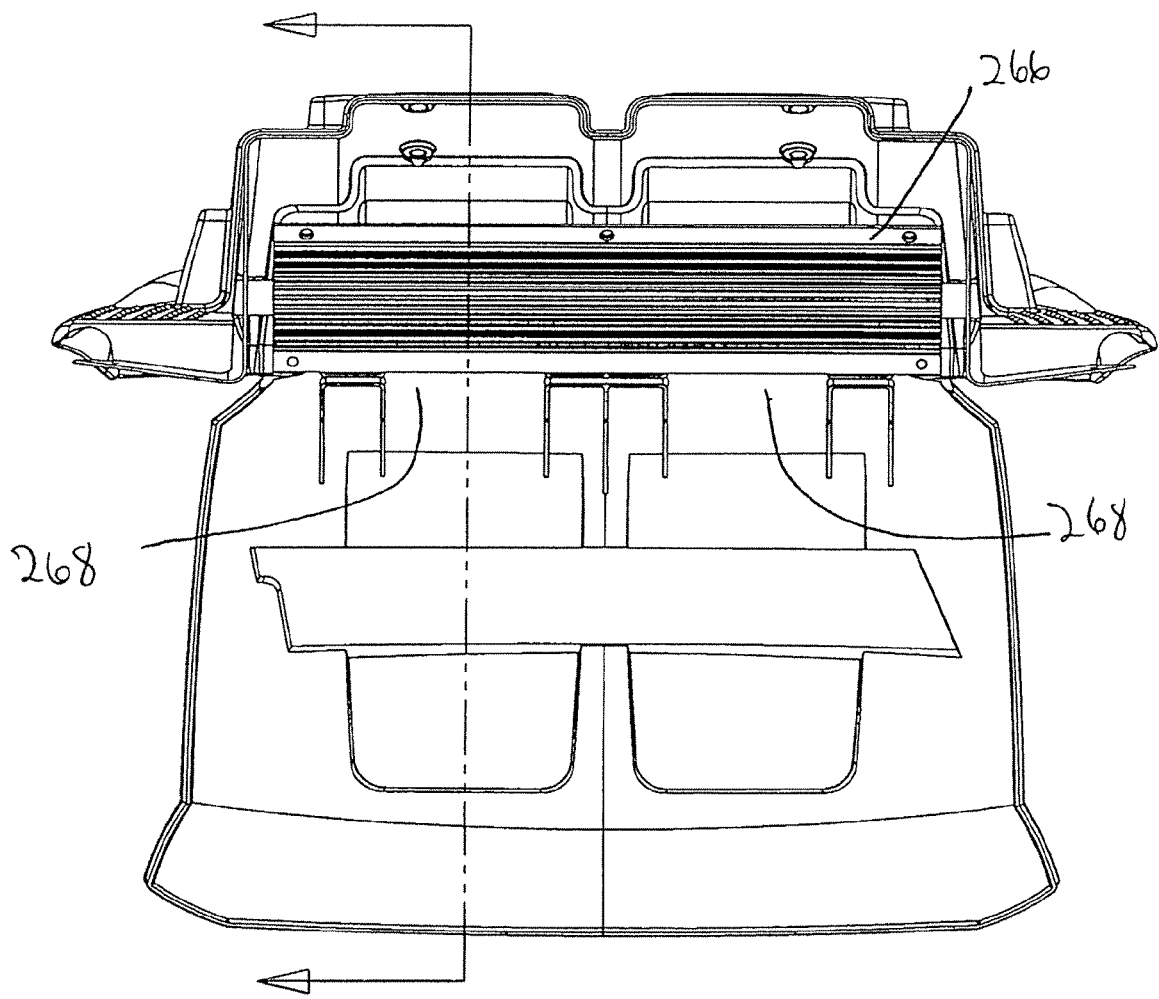
Figure 8:
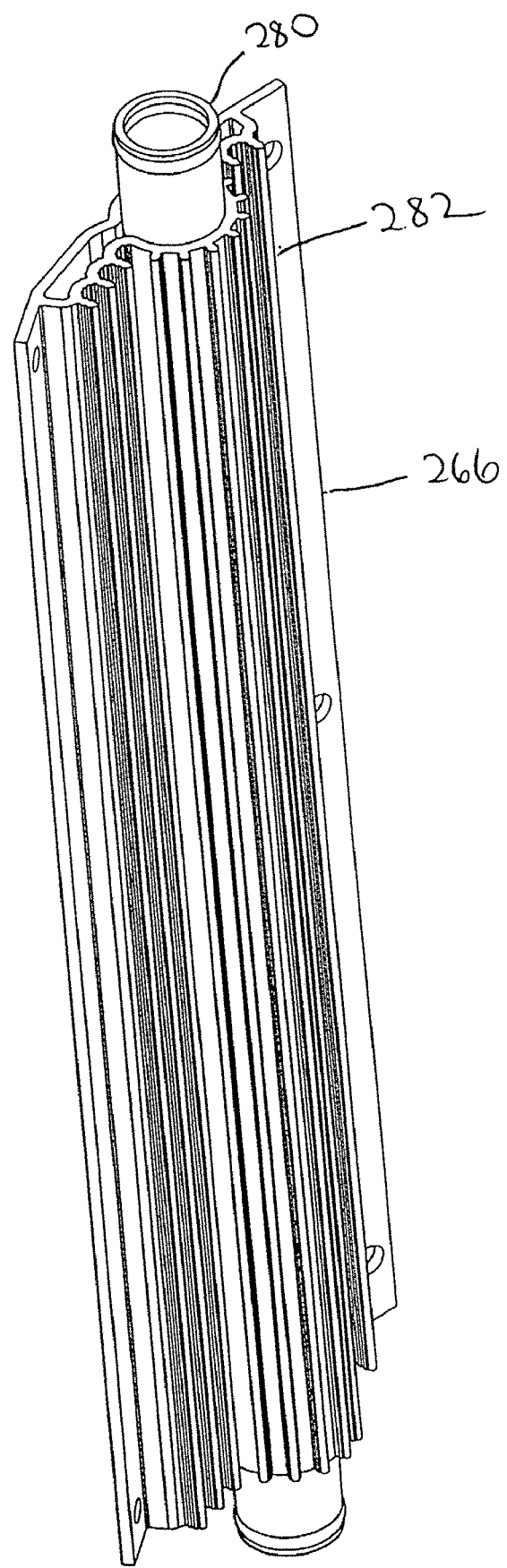
FIG. 8 is a perspective view of a heat exchanger that can be used with the present invention.

The heat exchanger may have a configuration shown in FIG. 8. In one embodiment, the heat exchanger may include a coolant tube 280 and a heat dissipating plate 282 secured to the coolant tube, e.g. by welding or other suitable methods. As seen in FIGS. 7 and 8, the inward face of the heat exchanger (facing the endless track) may be provided with ribs that increase the effective surface area of the coolant tube and/or heat dissipating plate, thereby increasing the cooling ability of the heat exchanger. The outward face (facing the wall of the rear molded member or tunnel) has a relatively smooth shape, facilitating the passage of snow behind the heat exchanger.

In the illustrated embodiment, the heat dissipating plate is formed by extrusion, and the coolant tube passes through the extrusion. In this case, the ends of the extrusion may be left open as illustrated. It also is possible to close the ends of the extrusion, and replace the coolant pipe with a pair of spigots, one at each end of the extrusion, for delivering coolant to and carrying coolant from the interior of the extrusion. This allows coolant to be exposed to more of the interior of the heat dissipating plate, and can increase the effective cooling capacity of the heat exchanger. In this case, the extrusion can be closed by any suitable method, such as welding or use of a sealing member.

Figure 9:
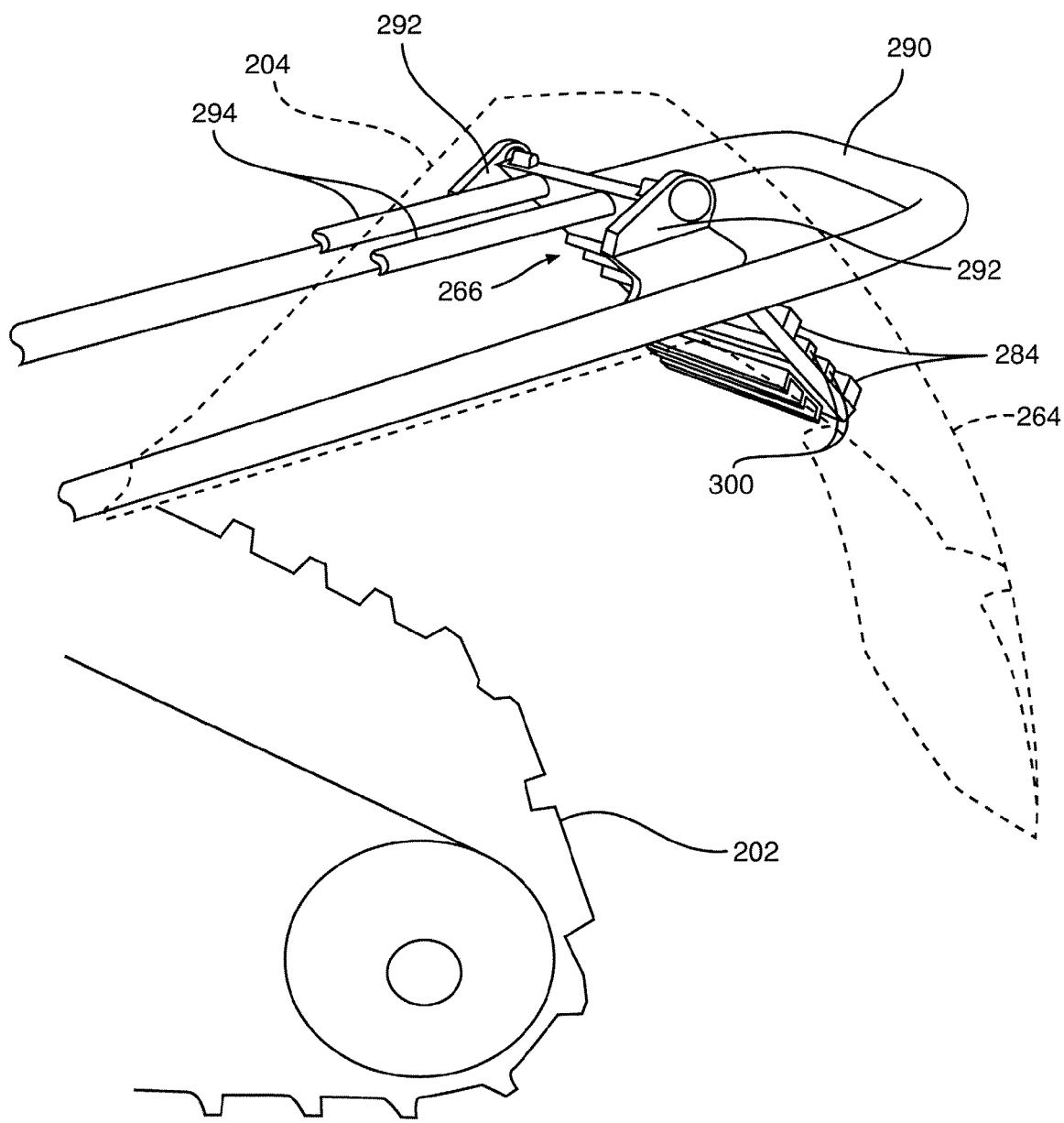
FIG. 9 is an isometric view of an alternative embodiment of a heat exchanger, in accordance with an embodiment of the present invention.
Figure 10:
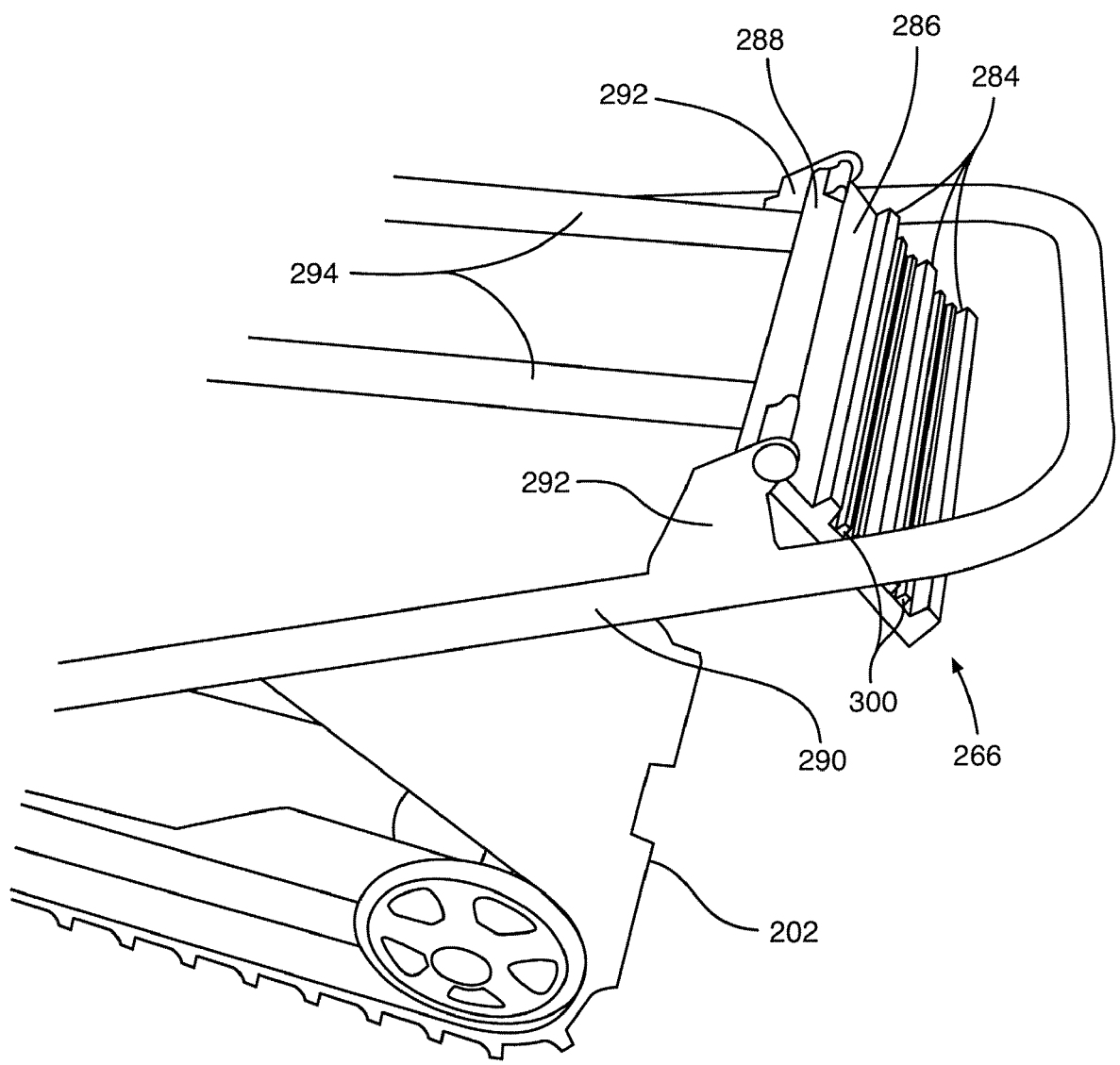
FIG. 10 is a partial isometric view of an upper channel formed in the heat exchanger of FIG. 9, in accordance with an embodiment of the present invention.
Figure 11:
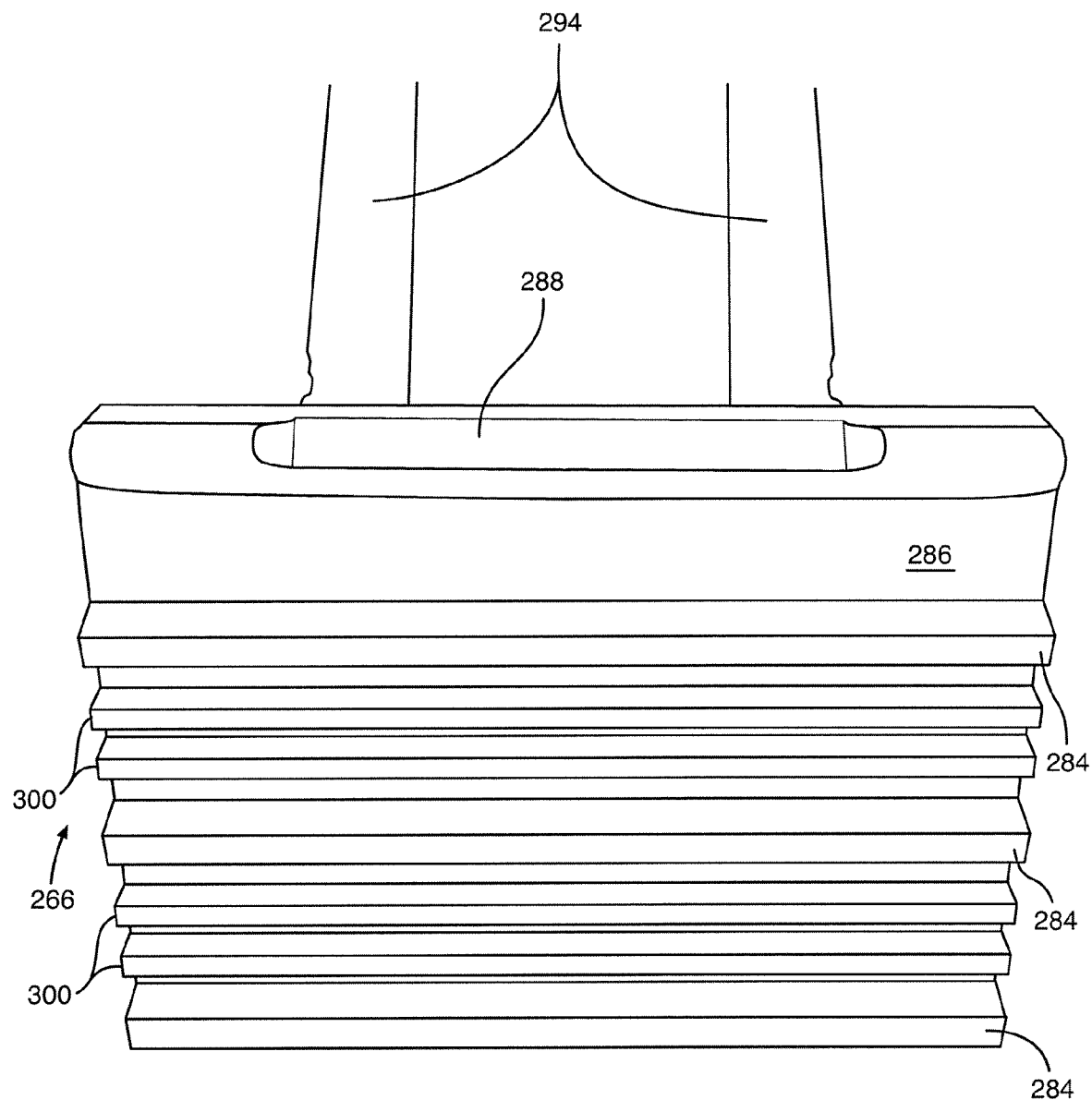
FIG. 11 is a rear isometric view of the heat exchanger of FIG. 9.

FIGS. 9-11 are isometric views of an alternative embodiment of a heat exchanger 266. The heat exchanger 266 includes a plurality of ridges 284 extending away from the rearward face 286 of the heat exchanger 266. The ridges 284 serve to collect snow thrown thereon by the endless track 202. The ridges 284 may have channels formed therein for transporting a cooling fluid through the ridges 284 to enhance heat transfer away from the cooling fluid. A recess 288 is preferably formed at the top of the heat exchanger 266 to enable snow to pass between the heat exchanger and the tunnel 204 of the snowmobile. Additional clearance between the heat exchanger and the tunnel permits the passage of snow between the heat exchanger 266 and the tunnel 204. In operation, the track 202 will induce airflow over the heat exchanger 266. The recess 288 or gap between the heat exchanger 266 and the tunnel 204 further permits airflow over the rear surface 286 of the heat exchanger.

In one embodiment, the heat exchanger 266 secures to a frame 290 secured to the chassis of the snowmobile 200. The heat exchanger 266 mounts to the frame 290 by means of brackets 292 that maintain the heat exchanger 266 oriented vertical or tilted slightly forward as illustrated. Tubes 294 extending from the engine carry coolant to and away from the heat exchanger 266. The tubes 294 may bear fins to enhance heat transfer.

Figure 12:
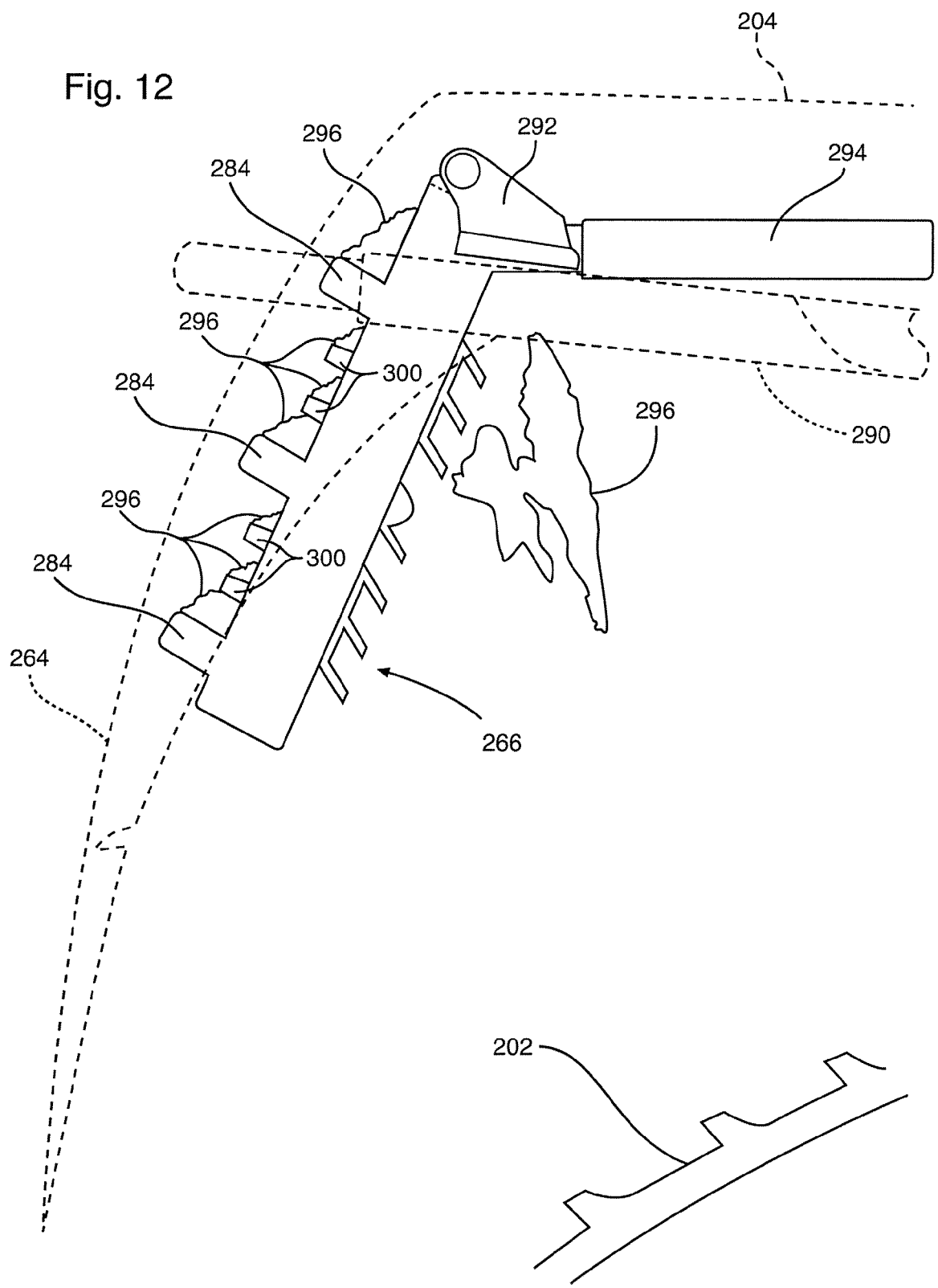
FIG. 12 is a side view of the heat exchanger of FIG. 9.
Figure 13:
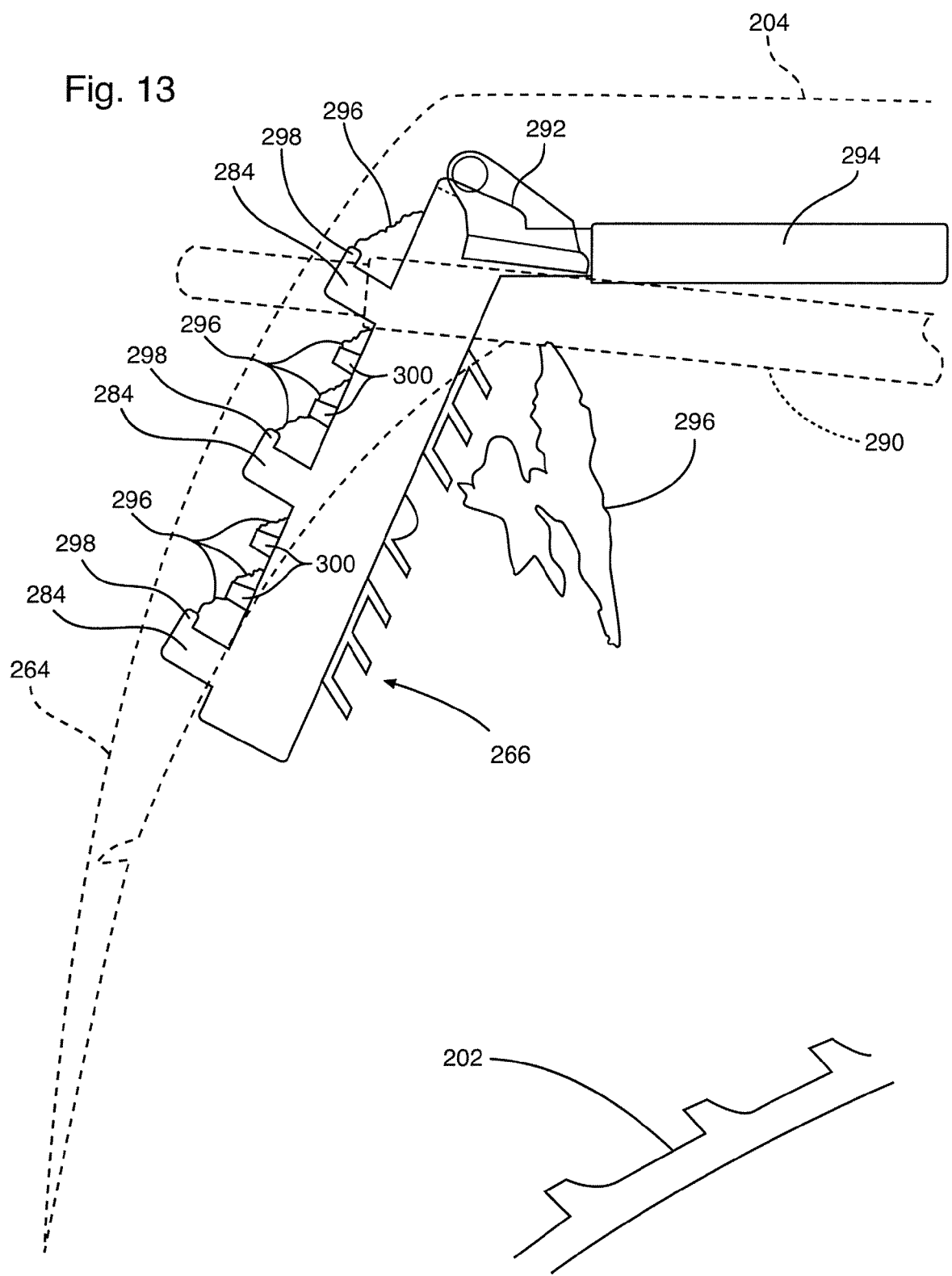
FIG. 13 is side view of an alternative embodiment of the heat exchanger of FIG. 9.

Referring to FIG. 12, while still referring to FIGS. 9-11, the heat exchanger is preferably positioned near the rear of the snowmobile near the rear flap 264. The recess 288 is positioned such that a portion of the snow 296 thrown up by the endless track 202 will pass through the recess 288 and lodge on the upper surfaces of the ridges 284. In an alternative embodiment, the recess 288 is omitted and the heat exchanger 266 is mounted such that its upper end is slightly separated from the top wall 206 of the tunnel 204, allowing snow to pass through the gap. In yet another alternative both a gap and a recess 288 are provided to provide additional space to channel air and snow. In operation, the snow 296 will typically cake the rear surface of the heat exchanger 266, ensuring constant cooling. Referring to FIG. 13, in some embodiments, a lip 298 is formed near the ends of the ridges 284 to enhance the collection of snow.

In addition to the ridges 284, smaller ridges or fins 300 may be provided between the ridges 284 to facilitate cooling. In one embodiment, the ridges 284 container inner channels carrying cooling fluid, whereas the smaller ridges or fins 300 do not. A front surface 302 of the heat exchanger 266 may further include ridges 302 to enhance heat transfer. In the illustrated embodiment, the ridges 302 are angled downwardly from the front surface 302.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A heat exchanger for a snowmobile having a chassis and an endless track, the heat exchanger comprising:

a radiator formed of a heat-dissipating plate having front, rear, top, first lateral, second lateral, and bottom surfaces, the plate adapted to be secured to the chassis above at least a portion of the track, the plate having its front surface facing the track and having its rear surface spaced from the chassis so as to define a gap between at least one of the top and bottom of the plate and the chassis and extending downwardly from the chassis, the gap providing a channel in communication with a space between the track and the chassis for snow and air to travel to the rear surface of the plate, the plate including a fluid channel therethrough between the front and rear surfaces.

2. The heat exchanger of claim 1, wherein the radiator further comprises a plurality of ridges extending across the rear surface between the first and second lateral surfaces of the radiator.

3. The heat exchanger of claim 1, wherein an upwardly extending lip extends from a distal end of each of the ridges.

4. The heat exchanger of claim 1, further comprising an upper channel formed in the top surface, the upper channel extending between the front and rear surfaces.

5. The heat exchanger of claim 1, wherein the front and rear surfaces have an area substantially greater than that of the top and bottom surfaces.

6. The heat exchanger of claim 1, further comprising fins secured to the heat exchanger between the plurality of ridges, the fins being substantially smaller than the ridges.

7. A snowmobile comprising:
a tunnel having top and side surfaces and a forward end positioned proximate an engine and a rearward end opposite the forward end, a rear flap secured near the top surface of the tunnel proximate the rearward end; and
a heat exchanger secured to the tunnel near the top surface of the tunnel and extending downwardly therefrom, the heat exchanger and rear flap defining a gap therebetween, the gap providing an opening for air and snow to enter from an area between the track and tunnel to behind the heat exchanger, the heat exchanger comprising a plurality of ridges extending into the gap.

8. The heat exchanger of claim 7, wherein the rear flap extends rearwardly outward from the tunnel.

9. The snowmobile of claim 7, further comprising fins secured to the heat exchanger adjacent at least one the plurality of ridges, the fins being substantially smaller than the ridges.

10. The heat exchanger of claim 8, further comprising a lip extending from a distal end of each of the plurality of ridges.

11. The heat exchanger of claim 8, further comprising an air channel formed in the heat exchanger positioned proximate the top surface of the tunnel.

12. The heat exchanger of claim 8, wherein an upper surface of the heat exchanger is distanced from the top surface of the tunnel.

13. The snowmobile of claim 8, wherein the heat exchanger comprises a fluid channel formed therein.

14. The snowmobile of claim 13, wherein a portion of the fluid channel passes through at least one of the plurality of ridges.

15. A method for cooling a snowmobile engine comprising:
providing a tunnel having top and side surfaces and a forward end positioned proximate an engine and a rearward end opposite the forward end, a rear flap securing near the top surface of the tunnel proximate the rearward end, an endless track drive system being positioned partially within the tunnel; and
providing a heat exchanger having front and rear surfaces secured within the tunnel near the top surface of the tunnel and extending downwardly therefrom, the rear surface and rear flap defining a gap, the heat exchanger comprising a plurality of ridges extending outwardly from the rear surface into the gap;
driving the endless track over a snow-covered surface;
throwing snow from the endless track onto the plurality of ridges and the rear surface; and
forcing fluid through a fluid channel formed in the heat exchanger.

16. The method of claim 15, wherein the heat exchanger comprises an air channel formed in the heat exchanger and positioned proximate the top surface of the tunnel, the method further comprising, throwing snow through the air channel onto the upper surfaces of the plurality of ridges.

17. The method of claim 15, wherein an upwardly extending lip secures to a distal end of each of the plurality of ridges.

18. The method of claim 16, further comprising, inducing air-flow through the air channel.

* * * * *